Figure 1:
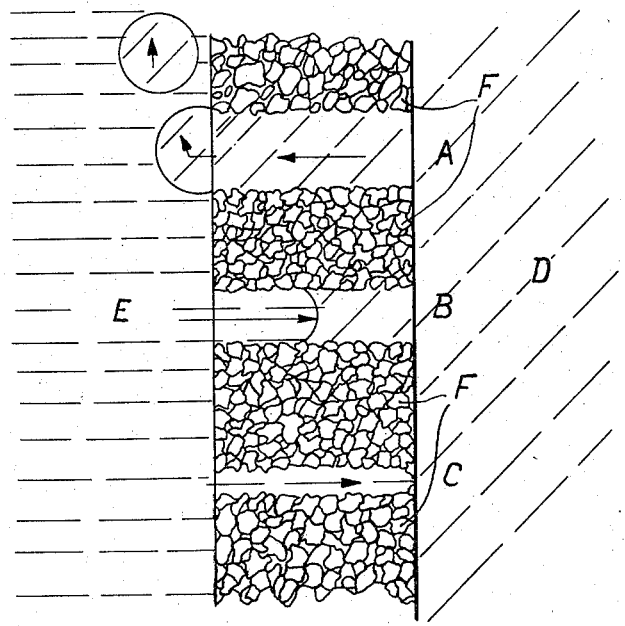

Nov. 11, 1958  E. JUSTI  2,860,175
HOMEOPOROUS GAS-DIFFUSION ELECTRODE FOR GALVANIC CELLS
Filed Sept. 5, 1956  5 Sheets-Sheet 1

INVENTOR
EDUARD JUSTI
ATTORNEYS

Nov. 11, 1958 — E. JUSTI — 2,860,175

HOMEOPOROUS GAS-DIFFUSION ELECTRODE FOR GALVANIC CELLS

Filed Sept. 5, 1956

INVENTOR
EDUARD JUSTI

Nov. 11, 1958     E. JUSTI     2,860,175
HOMEOPOROUS GAS-DIFFUSION ELECTRODE FOR GALVANIC CELLS
Filed Sept. 5, 1956     5 Sheets-Sheet 5

INVENTOR
EDUARD JUSTI
By Burgess, Dinklage & Sprung
ATTORNEYS

United States Patent Office 2,860,175
Patented Nov. 11, 1958

2,860,175

HOMEOPOROUS GAS-DIFFUSION ELECTRODE FOR GALVANIC CELLS

Eduard Justi, Braunschweig, Germany, assignor to Ruhrchemie Aktiengesellschaft, Oberhausen-Holten, Germany, and Steinkohlen-Elektrizitat Aktiengesellschaft, Essen, Germany Application September 5, 1956, Serial No. 608,071

Claims priority, application Germany September 5, 1955

7 Claims. (Cl. 136—120)

This invention relates to new and useful improvements in gas-diffusion electrodes.

Fuel cells for the direct production of electrical energy from gaseous fuels such as hydrogen, carbon monoxide, methane, etc. and air or oxygen are known ("Die Diffusionsgas-elektrode," Stuttgart 1923 Verlag Encke). These fuel cells basically consist of an electrolyte bath such as a KOH bath having two spaced apart gas-diffusion electrodes positioned therein. The gas diffusion electrodes are porous rigid bodies of carbon or metal such as nickel, as for example, in the form of hollow cylinders. A gaseous fuel such as hydrogen, carbon monoxide, methane etc., is passed into the hollow interior of one of the gas-diffusion electrodes which is termed the fuel electrode and an oxygen-containing gas such as air or oxygen is passed into the hollow interior of the other gas-diffusion electrode which is termed the oxygen electrode. In the pores of the porous cylinders forming the gas-diffusion electrodes, the gas is adsorbed, disassociated and deadsorbed in ionized form. Thus, for example, when hydrogen is used as a fuel, the hydrogen atoms are adsorbed in the pores of the fuel electrode, de-adsorbed as $H^+$ ions leaving behind an electron. The $H^+$ ions migrate into the electrolyte surrounding the fuel electrode. In the same manner, the oxygen is adsorbed in the pores of the oxygen electrode, deadsorbed as $O^-$ ions leaving behind two positive charges and migrating into the electrolyte where the same combines with the $H^+$ ions forming water molecules. The charges left behind at the electrodes furnish electric current for an external circuit. In this manner the oxidation results only in electric energy rather than in less efficient thermal energy, thus eliminating the necessity of converting the thermal energy into mechanical energy and converting the latter into electrical energy by means of engines such as steam engines and generators with the known poor efficiency of the Carnot process.

While theoretically the efficiency of gas-diffusion electrodes is relatively high, unfortunately in practice the efficiency of the available electrodes are relatively low since only a portion of the fuel gas or oxygen introduced is ionized and consequently activated electro-chemically. In the operation of a fuel cell, a bubbling of the gas through the electrodes escaping into the electrolyte may always be noted. This escaping gas which forms the bubbles is not adsorbed nor de-adsorbed and thus is not electrochemically utilized. Good electrodes which are presently available, at a gas pressure of about 1 kg./sq. cm., allow about 90% of the gases to bubble through unused so that only 10% of the gases is utilized. Therefore the efficiency of the cell which, for example, would otherwise be around 70% is reduced by 10% x 70% to a value of about 7%. Thus the theoretical efficiency of the fuel cell is lost and in practice a heat engine is more efficient since modern heat engines have higher efficiencies than about 30%.

Figure 2:
Figure 3:
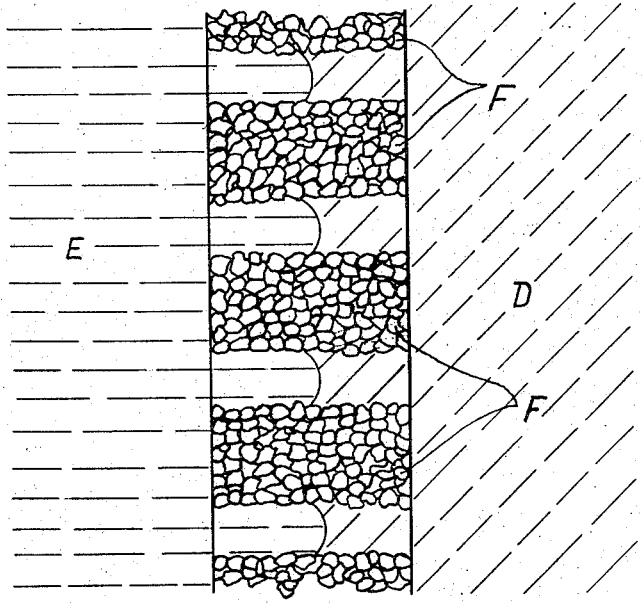
Figure 4:
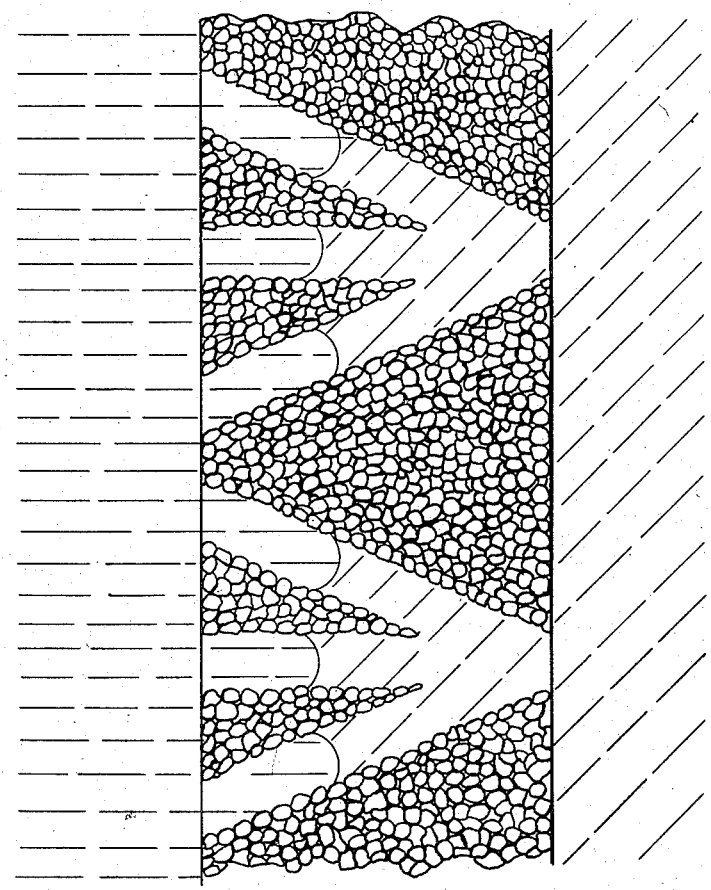
Figure 5:
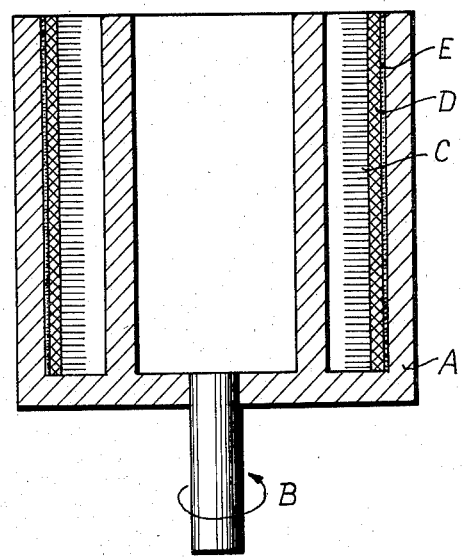
Figure 6:
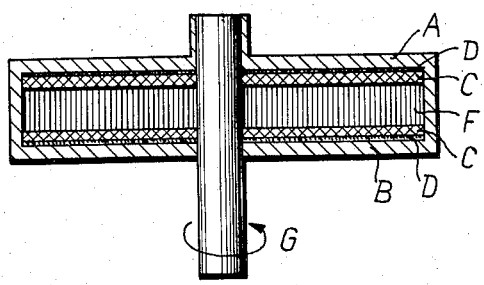

One object of this invention is a gas-diffusion electrode which, when used in a fuel cell, will utilize a much larger quantity of the gas supply for the electrochemical conversion and which will not allow such a large amount of gas to bubble through unused. This and still further objects will become apparent from the following description read in conjunction with the drawings in which:

Figure 1 diagrammatically shows a vertical section of a portion of a wall of a gas-diffusion electrode, Figure 2 shows a vertical section of a portion of a wall of a conventional gas-diffusion electrode enlarged about 1000 times, Figure 3 is a diagrammatic section through the wall of an embodiment of a gas-diffusion electrode in accordance with the invention, Figure 4 is a diagrammatic section through the wall of a further embodiment of a gas-diffusion electrode in accordance with the invention, Figure 5 is a diagrammatic vertical section of an embodiment of an apparatus for producing a gas-diffusion electrode in accordance with the invention, and Figure 6 is a diagrammatic vertical section of a still further embodiment of an apparatus for producing a gas-diffusion electrode in accordance with the invention.

In co-pending application Serial No. 574,123, filed March 27, 1956, it is pointed out that the poor efficiency of the prior known fuel cells was due to the escape of the gas bubbles through the un-uniform pores of the gas-diffusion electrodes. In the production of the porous gas-diffusion electrodes, the pore size would vary in accordance with the bell-shaped statistical distribution curve resulting in a large number of oversized pores through which the gas would escape. In accordance with the said application this disadvantage is in part avoided by plugging the oversized pores which are formed.

Figure 1 diagrammatically represent a vertical section of a portion of a wall of a gas-diffusion electrode of carbon or metal. The gas D is on the right hand side of the wall under superatmospheric pressure so that the same is forced into the pore B of the right size against the capillary pressure of the electrolyte E on the left hand side of the wall. A three-phase boundary between gas, electrolyte and electrode, is formed within the pore where the adsorption and de-adsorption and thus generation of the electrochemical force is effected. If, however, the pore is too narrow as, for example, the pore C, in relation to the surface tension of the electrolyte, the electrolyte will completely enter the same due to the capillary action and plug it. This pore is therefore no longer available for the production of electrochemical energy as the same is "drowned." On the other hand, if the pore is too wide, as for example the pore A, the gas simply passes through because of the low capillary counter-pressure of the electrolyte and escapes unused. It may thus be seen that only pores of the right diameter based on the capillary pressure of the electrolyte and the gas pressure will serve for the electrochemical energy production and the pores which vary in size below these will result in gas loss and drowning respectively. It is thus extremely important that the pore sizes of the gas-diffusion electrode be as uniform in size as possible so that the gas pressure may be adapted to the capillary pressure and a maximum utilization of the pores for the adsorption and de-adsorption without drowning and without the flowing of gas bubbles therethrough may be achieved. While the embodiment set forth in our said co-pending application in part achieves this result by plugging the oversized pores and thus prevents the escape of gas bubbles, the same does not eliminate the undersized pores which are drowned. Furthermore, the pores of the conventionally formed gas-diffusion electrodes are not in form of continuous passage of channels extending through the wall of the electrodes but are collectively defined by the spaces between the individual particles, etc., and have a zig-zag shape with partially dead pores of various inside diameters and directions which are fortuitously formed by pressing and sintering as is shown in Figure 2. The three-phase boundary of course may not be formed in the dead pores which do not communicate from one surface of the electrode to the opposed surface and the variations in size of the individual pore passages formed will tend to destroy this three-phase boundary. This disadvantage of course is not avoided by the plugging of the oversized pores in accordance with our co-pending application.

In accordance with the invention, in place of pores which are formed inherently in the pressing and sintering operations, the gas-diffusion electrodes are formed with artificial continuous passages or channels which preferably extend straight through the electrode wall by incorporating suitable filaments in the pressed or sintered bodies and thereafter eliminating the filaments forming the continuous channels or passages. This results in the formation of a substantially homoporous sintered body having continuous channels extending therethrough, the size of which do not differ from each other by more than ±50% in length and in diameter and which deviate as little as possible from each other in direction and preferably do not deviate by more than 45% from the shortest connection between the opposed surfaces, i. e., the surfaces in contact with the electrolyte and gas. The channels preferably have an average diameter between about $1-25\mu$.

The gas-diffusion electrode, in accordance with the invention, may therefore have a wall-crossed section such as is diagrammatically represented in Figure 3. The gas D on the right-hand side is under superatmospheric pressure and can enter into the channels against the capillary pressure of the electrolyte E on the left-hand side forming the electro-chemically active three-phase boundary in each of the channels. It is particularly advantageous if 90% of all pores are equal in diameter and length and the remainder not differing by more than ±50% from these values.

The filaments which are incorporated in the pressed or sintered bodies forming the electrodes may be of any desired material which may be subsequently eliminated and are preferably textile fibers or thin metal wires of relatively short length. Use may also be made, for example, of natural bristles or bristles of plastic as are used in the manufacture of fine brushes. The thickness of the filaments must be adapted to the diameter desired of the channels.

The filaments of the length required as, for example, 3 mm. may be arranged in parallel by rolling or vibrating and the voids between the bristles so arranged in one direction, are then filled with a very fine-grained electrode material, as for example, finely ground graphite, carbon or metal. The mixture thus obtained is then solidified by pressing or sintering. Thereafter, the bristles are removed, as for example, by chemical treatment unless they have already been removed by a sintering effected under appropriate conditions in an oxidizing or reducing atmosphere depending upon the intended use of the electrode. The final product obtained is a sintered body, as is shown in Figure 3, having approximately parallel channels of equal diameters and length. The bodies may be formed in suitable shape for the electrodes, as for example, in the form of a hollow cylinder or any other conventional electrode shape. It is, however, somewhat cumbersome and expensive to prepare the parallel filaments such as the bristle and to prepare the electrode bodies therefrom in the manner described above.

In accordance with a further embodiment of the invention, an electrode having channels which are not quite parallel but somewhat divergent, as is shown in Figure 4, may be prepared in a considerably simpler and more economical manner with the use of a pile fabric, such as a commercially available velvet or plush having, for example, about 500 pile tufts per square centimeter, each tuft comprising, for example, 50 diverging threads of 0.015 mm. in thickness and 2 mm. in length. When velvet or plush of this type is used as a filler in producing gas-diffusion electrodes by the process of the invention, about 25,000 channels of nearly uniform cylindrical cross section are obtained per square centimeter. These channels preferably extend at right angles between the proposed surface, insuring uniform operating condition when the electrodes are used in fuel cells, thus permitting extremely high current densities. The pile fabrics, such as the velvet, with a sufficiently long pile may be woven or sewed together in the form of a hollow cylinder which is placed in a hollow cylindrical metal mold, as diagrammatically shown in Figure 5 with the pile fabric base being designated D, the pile C and the metal cylinder A. The base of the pile may be attached to the walls of the cylinder in any desired manner, as for example, by gluing. The hollow cylinder A is then rotated around axis B at high speed while filling in a carbon or metal powder having an average particle size which is less than the thickness of the pile threads. Due to the force of gravity and the centrifugal force, the powder will completely fill out the spaces between the pile threads C. An increase in the centrifugal force or a subsequent compression provide the preconditions for the subsequent sintering under vacuum in a neutral, reducing or oxidizing atmosphere. By effecting the sintering under appropriate conditions, the pile filler threads may be sublimed or burned off or led off as a hydrocarbon and steam.

The electrode bodies may also be conveniently made by pouring very fine metal powders which, for example, may have been air-sifted on the pile surface of the velvet while gently knocking or vibrating if necessary or desired, and then pressing the powder under pressure in the order of 500 to several thousand kg./sq. cm. Even this simple method results in channels which give very good results.

If the piles have a divergent or tuft-like form, the channels formed will have a corresponding form as shown in Figure 4. As may be seen, three-phase boundary is still formed in each of the channels and it is possible with such an arrangement of the channels to exchange the electrolyte and gas sides of the cell.

When pile fabric or a bristled surface is used in which the piles do not extend in the tuft-like arrangement but extend substantially parallel to each other, then of course the electrode body will have a cross-sectional shape corresponding to Figure 3.

The gas-diffusion electrodes, in accordance with the invention, which have channels parallel to each other, as shown in Figure 3, may be produced with the use of double piled fabrics having two parallel fabric bases with the pile threads extending therebetween at approximately right angles. Such fabrics are conventionally woven on a double shuttle plush loom and formed into individual single face pile fabrics by cutting through the middle of the pile as the fabric webs come off the loom. In this method, the length of the pile threads between the fabric webs is adapted to the thickness of the diffusion electrode to be produced.

As diagrammatically shown in Figure 6, a circular piece of the double-pile fabric having the two fabric web portions C connected by the uncut pile threads F are placed between a circular upper plate A and a bottom plate B of metal or plastic. The plates A and B are joined together by an annular edge so that the same are in the form of a flattened cylinder. The backs of the pile fabric may be attached to the respective plates as, for example, by gluing.

The electrode materials, such as graphite powder, carbon powder or metal powder having a particle size which is smaller than the thickness of the pile threads F is then filled in through an opening provided in the upper plate. The plates are rotated around the axis G at high speed and due to the force of gravity and the centrifugal force, the powder filled-in, enters in a vertical and radial direction, filling the spaces between the threads, and is mechanically retained in place. Sufficient compacting of the mixture may be obtained by increasing the speed of rotation and may, if required, be improved by subsequent compression. The production of a gas-diffusion electrode of this type is preferably effected with the use of a mixture of nickel powder and Raney alloy, as suggested, for example, in copending application Serial No. 542,434 filed October 24, 1955. The pile fabric which is used as the filler may, for example, consist of Perlon plush. (Perlon is a trademark designating fibres of caprolactam polymerization, which may be worked up into various kinds of textile fabrics. The same has been described in the publication S. Chem. Textil, Fibres, Films and Foils, Rudolf Pummerer, Ferdinand-Enke-Verlag, 1953.) The removal of the filler threads is completed or partially effected in the sintering under vacuum in a reducing or oxidizing atmosphere. This may be followed by a chemical aftertreatment in acids or alkali solutions, particularly in a potash solution if the latter is to be used as the electrolyte liquid.

The following materials may be used for the production of the electrodes:

(a) Graphite, carbon.

(b) Any metal which is not attacked by concentrated potash solution, as, for example, the metals of the 8th group of the periodic system such as iron, cobalt, nickel, palladium, etc., and copper, silver, gold, etc.

(c) Alloys of such metals with each other or with less noble metals as far as these alloys are stable in lyes.

(d) The metal oxides with metallic semi-conduction which are insoluble in potash solution.

(e) Mixtures of powders of the materials mentioned under (a), (b) and (c) above.

(f) Mixtures of materials mentioned under (a), (b) and (c) with such metal alloys which after having dissolved out a constituent remain in a catalytically highly active form (Raney alloys for example).

The particle size of the materials mentioned above ranges between $0.5\mu$ and $40\mu$ and preferably between $1\mu$ and $15\mu$.

The number of passages or channels should range between 5000 and 1,000,000 per square centimeter of geometric electrode surface. Particularly favorable results are obtained with electrodes in which 10,000 to 100,000 channels are formed per square centimeter of geometric electrode surface.

The following examples are given by way of illustration and not limitation:

Example 1

A velvet of Perlon having per sq. cm. of geometric surface 500 pile tufts with each tuft having 50 threads of $15\mu$ in diameter and 2 mm. in length was placed into the collector of a wind sifter and dusted with a pulverulent mixture (mixing proportion 1:3) of a Raney alloy consisting of 50% nickel and 50% aluminum, and carbonyl nickel powder. The grain size of the mixture was $1-3\mu$. After the dusting, the velvet was pressed with a pressure of 1000 kg./sq. cm. and then the body was heated at a temperature of 250° C. in a hydrogen stream. Thereby, the Perlon fabric was decomposed and, consequently, the 25,000 channels per sq. cm. of geometric surface were set free. Following this, the body was sintered for 30 minutes at 750° C. in a hydrogen stream. After a treatment with potash solution in which the aluminum was dissolved out of the Raney nickel, the electrode was operated in 6-normal KOH as a hydrogen electrode with no hydrogen gas escaping in form of bubbles into the electrolyte.

Example 2

A velvet of Perlon having 500 pile tufts per sq. cm. of geometric surface with each tuft having 50 threads of $15\mu$ in diameter was attached to the bottom of a container which was then covered with a layer of copper powder of 10 mm. depth and having a particle size of less than $5\mu$. Thereafter, the container, in a centrifuge, was rotated for 10 minutes at about 1000 R. P. M. Thereby, the powder was pressed into the velvet due to the centrifugal force. Following this, the dusted velvet was compacted by pressing under a pressure of 1000 kg./sq. cm. and sintered for 30 minutes at 650° C. in a hydrogen stream. The finished body from which the Perlon had been removed by a thermal treatment exhibited 25,000 channels per sq. cm. of geometric surface. It operated in 6-normal KOH as a carbon monoxide electrode with no electrochemically unused gas flowing through.

Although the invention has been described in detail with reference to the specific embodiments shown, various changes and modifications which fall within the spirit of the invention, and the scope of the appended claims, may become apparent to the skilled artisan.

We claim:

1. A gas-diffusion electrode for a fuel cell having substantially straight continuous channels of an average cross-sectional size between $1-25\mu$ extending therethrough, said channels not differing in their length and diameters by more than $\pm 50\%$ and extending so that 90% of the channels do not diverge in direction by more than 45° from the shortest path between opposed surfaces of the electrode.

2. Process for the production of homeoporous sintered bodies such as gas-diffusion electrodes for fuel cells, which comprises forming a shaped body of finely divided particles selected from the group consisting of graphite, carbon and metal by distributing said particles around piles of a pile fabric having an average thickness between $1-25\mu$, 90% of which do not diverge direction by more than 45° from the shortest path between opposed surfaces of the body, converting the particles into solid form by at least one of compression and sintering and thereafter eliminating said pile fabric.

3. Process according to claim 2 in which said pile fabric is positioned lining the inner surface of a rotating cylinder in which said particles are distributed around said piles by introducing the same into said rotating cylinder.

4. Process according to claim 2 in which said pile fabric is a double pile fabric and in which said shaped body is formed by introducing particles between the backings of said double pile fabric surrounding the pile thread and converting the particles into solid form by at least one of compression or sintering.

5. Process according to claim 4 in which one of the backings of the double pile fabric connected to an upper rotating plate and the other said fabric backings is connected to a lower synchronously rotating plate, and in which said particles are introduced between said fiber backings by centrifugal force.

6. Process according to claim 5 in which said particles have a smaller size than the diameter of said pile threads.

7. Process according to claim 2 in which said particles have a smaller diameter than the diameter of pile threads of said fabric.

References Cited in the file of this patent

UNITED STATES PATENTS

| Number | Name | Date |
|---|---|---|
| 2,243,219 | Morgan | May 27, 1941 |
| 2,276,188 | Greger | Mar. 10, 1942 |
| 2,384,463 | Gunn et al. | Sept. 11, 1945 |
| 2,435,227 | Lester | Feb. 3, 1948 |
| 2,506,244 | Stopka | May 2, 1950 |
| 2,751,293 | Haller | June 19, 1956 |